E. T. WADE.
COMBINED RAIL JOINT AND NUT LOCK.
APPLICATION FILED MAY 5, 1913.
1,077,770.
Patented Nov. 4, 1913.
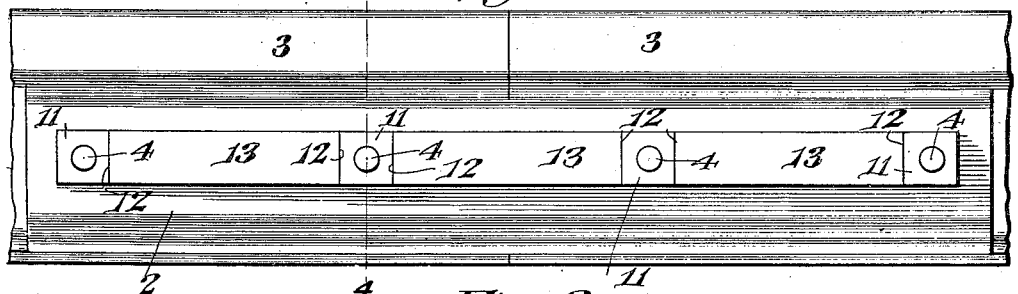
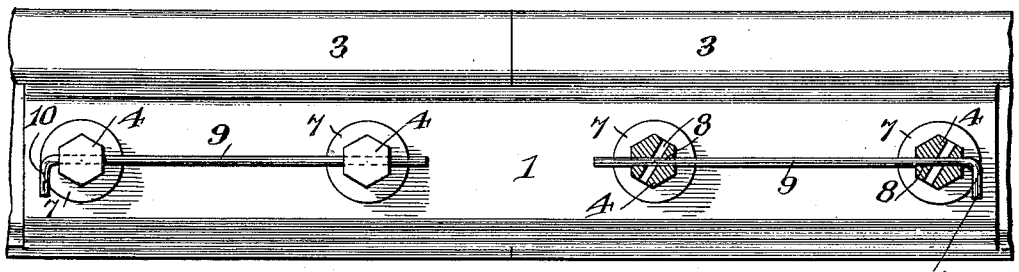
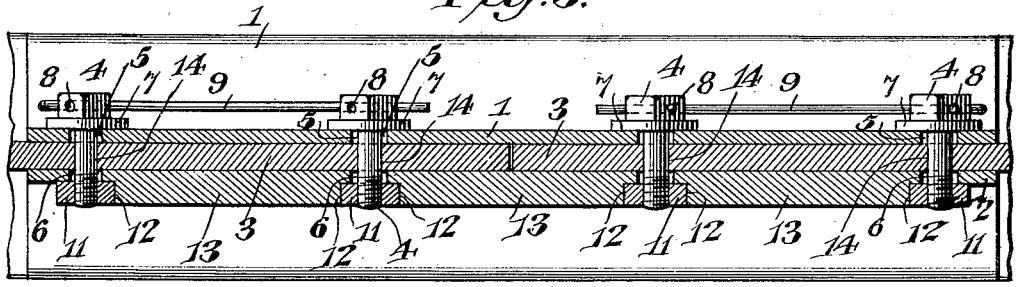
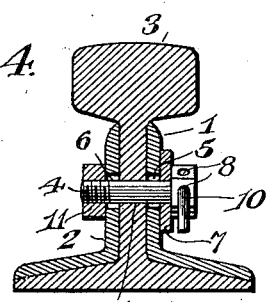
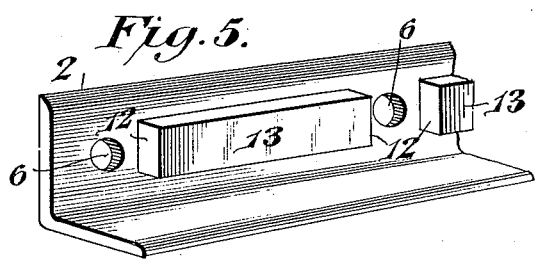
WITNESSES
Edwin T. Wade, INVENTOR
BY
ATTORNEY

UNITED STATES PATENT OFFICE.

EDWIN T. WADE, OF JACKSON, MISSISSIPPI, ASSIGNOR OF ONE-FOURTH TO CHARLES W. PAYNE, OF JACKSON, MISSISSIPPI.

COMBINED RAIL-JOINT AND NUT-LOCK.

1,077,770.  Specification of Letters Patent.  Patented Nov. 4, 1913.

Application filed May 5, 1913. Serial No. 765,588.

*To all whom it may concern:*

Be it known that I, EDWIN T. WADE, a citizen of the United States, residing at Jackson, in the county of Hinds and State of Mississippi, have invented a new and useful Combined Rail-Joint and Nut-Lock, of which the following is a specification.

The invention relates to improvements in rail joints.

The object of the present invention is to improve the construction of rail joints, and to provide a simple and inexpensive rail joint of strong and durable construction, equipped with nut locking means, adapted to securely lock the nuts of bolts without necessitating any alteration in the construction of the nuts.

A further object of the invention is to provide a rail joint of this character, in which the nut locking means will lie out of the path of the flanges of the wheels of a train and which will permit a vertical movement or adjustment of the nuts, so that the bolts will always fit and engage them properly.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a side elevation of a combined rail joint and nut lock, constructed in accordance with this invention. Fig. 2 is a similar view, showing the other side of the rail joint, the heads of one pair of bolts being in section. Fig. 3 is a horizontal sectional view of the combined rail joint and nut lock. Fig. 4 is a vertical sectional view on the line 4—4 of Fig. 1. Fig. 5 is a detail perspective view of a portion of one of the angle bar fish plates.

Like numerals of reference designate corresponding parts in all the figures of the drawing.

In the accompanying drawing in which is illustrated the preferred embodiment of the invention, 1 and 2 designate angle bar fish plates arranged at opposite sides of a pair of rails 3 and secured to the same by transverse bolts 4, passing through the webs of the rails and extending through openings 5 and 6 in the fish plates. The angle bar fish plates fit against the bottom flanges and the webs of the rails, and the bolts have their heads arranged adjacent to the fish plate 1, washers 7 being preferably interposed between the said fish plate 1 and the heads of the bolts.

In order to lock the bolts against rotary movement, their heads are provided with perforations 8, and they are adapted to be connected in pairs by rods 9, extending longitudinally of the rail joint centrally of the space between the heads of the rails and the bottom flanges thereof, and each provided at one end with an arm 10 and adapted to be secured in the perforations of the bolts by bending the other end at a slight angle. Any other suitable means, however, may be employed for locking the bolts against rotary movement.

The nuts 11, which are arranged on the threaded ends of the bolts, are preferably rectangular and they are located contiguous to straight vertical end faces 12 of longitudinal ribs 13, arranged in a series at the outer face of the upright portion of the angle fish plate 2 between the bolt openings 6, which are preferably of greater diameter than the openings 14 in the webs of the rails to allow for any variation in the position of the said openings 14. The longitudinal ribs 13, which are rectangular in cross section, are preferably of the same cross sectional area as the nuts and are spaced apart so that the intermediate nuts of the rail joint will be arranged between the ribs 13, while the end nuts fit against the outer ends of the terminal ribs 13, as clearly shown in Figs. 1 and 3 of the drawing. The nuts are adapted to slide upwardly and downwardly on the fish plate 2 between the ribs 13 and also at the ends thereof, so that the bolts will always fit. The openings 5 of the fish plate 1 are also preferably enlarged to facilitate an adjustment of the bolts to fit the openings 14 in the webs of the rails. While the openings 14 in the webs are shown of substantially the diameter of the bolts, they may be elongated to allow for the expansion and contraction of the rails due to the changes in temperature.

The nut engaging and bolt locking means of the fish plate 2 are located a sufficient distance below the heads of the rails to arrange them out of the path of the flanges of the wheels of a train, so that they will not be injured by the wheels of a train or interfere with the passage of the same over the rails.

What is claimed is:—

In a rail joint, the combination with a pair of rails provided in their webs with bolt openings, of fish plates located at opposite sides of the rails and also provided with bolt openings of greater diameter than those of the rails, one of the fish plates being provided on its exterior with a longitudinal series of integral longitudinally disposed ribs substantially rectangular in cross section and presenting vertical end faces at the sides of and in spaced relation with the bolt openings, bolts passing through the said openings, and nuts arranged on the bolts at the ends of the said ribs and fitting the space between the same, whereby they are held against rotary movement, said nuts being slidable vertically on the fish plates and coöperating with the enlarged bolt openings to permit a relative adjustment of the bolts and the nuts so that they will always fit.

In testimony, that I claim the foregoing as my own, I have hereto affixed my signature in the presence of two witnesses.

EDWIN T. WADE.

Witnesses:
D. T. McNAIR,
T. S. EVANS.